No. 30,468.

PATENTED OCT. 23, 1860.

I. DETHERIDGE, Jr.
KNIFE CLEANING APPARATUS.

Witnesses:

Inventor:
Isaac Detheridge Jr.

UNITED STATES PATENT OFFICE.

ISAAC DETHERIDGE, JR., OF NEW YORK, N. Y.

KNIFE-CLEANER.

Specification of Letters Patent No. 30,468, dated October 23, 1860.

*To all whom it may concern:*

Be it known that I, ISAAC DETHERIDGE, Jr., of New York city and county, New York, have invented a new and useful Improvement in Apparatus for Cleaning Knives for the Table; and I hereby declare that the following is a full and exact description thereof.

To enable others to make and use my invention, I proceed to describe its construction and operation, reference being had to the drawings hereunto annexed and making part of this specification.

Figure 1:
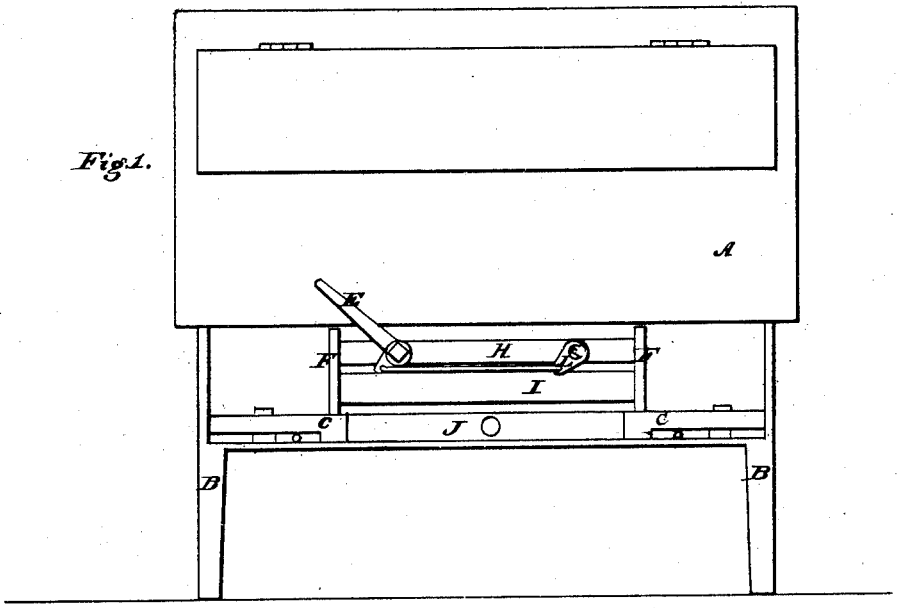
Figure 2:
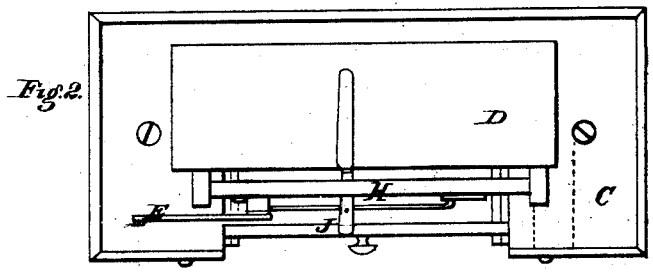
Figure 3:
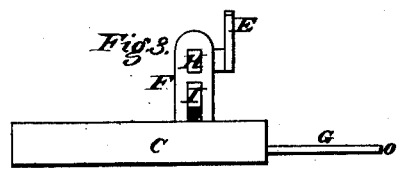

Figure 1 is an elevation of the table, opened, to display the knife cleaner; Fig. 2, plan of the knife cleaning apparatus; Fig. 3, end elevation of the same.

A is the frame or table top; B, legs; C, knife-cleaning board; D, the bed; E, the lever; F, end posts; G, slide; H, top bar; I, pressing bar; J, under bar; L, cams.

To render a knife cleaner of convenient use I inclose it in a table suitable for the kitchen, so that it may be always ready and in order for use.

I make a board about 2 ft. long and 15 in. wide for the knife cleaning apparatus. A portion is cut out of one side about 15 in. long to receive a bar, J. This has a flat piece at bottom to steady it and has on its top a piece of india-rubber, in which the knife handle is embedded by pressure by the pressing bar, I. Near the front of this board, C, I set two standards or posts, F. At the top between them is a fixed bar, H. Beneath them is another bar, I, having india-rubber on its under edge, and being made to slide up and down in the two posts, F. Under each end is a spiral spring. Over and upon it are two cams, L, connected by a rod. The cams are hinged in the fixed bar, H, and their points rest on the pressing bar and the lever E on the shaft of one of the cams is used to press down the under bar, I, upon the knife handle.

If a short and firm hold is wanted upon the knife handle, the bar J is moved in, even to a point directly under the pressing bar, if desired and thus the knife handle will have a solid support, or if the knife handle is strong, a wider bearing is better for it.

A cloth or strip of india rubber D may be put on the board on which to rest the knife blades while the brush or rubber is passed over them. This board is adapted for 12 or 15 knives which can all be cleaned in the time it would ordinarily take to clean one.

In Fig. 3 is shown the slide G. This is a strip of board placed under the platform, to draw out and has upon it a piece of chamois leather, which is useful to dry and polish the knives after they have been rubbed bright.

What I claim as my invention, and desire to secure by Letters Patent, is—

The operating parts, (to wit, the lever and cams L and E working the bar I) in combination with the adjustable bar J the whole constructed and arranged substantially as, and for the purposes above described.

ISAAC DETHERIDGE, JR.

Witnesses:
OWEN G. WARREN,
ISAAC DETHERIDGE.